US011677424B1

United States Patent
Ahirwar

(10) Patent No.: US 11,677,424 B1
(45) Date of Patent: Jun. 13, 2023

(54) TRANSMIT SPECTRUM MANAGEMENT FOR BLUETOOTH COMMUNICATION AND APPARATUS FOR MANAGEMENT

(71) Applicant: NXP USA, Inc., Austin, TX (US)

(72) Inventor: Vijay Ahirwar, Pune (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/713,056

(22) Filed: Apr. 4, 2022

(51) Int. Cl.
H04B 1/04 (2006.01)
H04L 27/12 (2006.01)

(52) U.S. Cl.
CPC .......... H04B 1/0475 (2013.01); H04L 27/12 (2013.01)

(58) Field of Classification Search
CPC ....... H04L 27/122; H04L 27/12; H04L 27/26; H04B 1/04; H04B 1/0475
USPC .................................................. 375/295–297
See application file for complete search history.

(56) References Cited

U.S. PATENT DOCUMENTS

| | | | |
|---|---|---|---|
| 5,832,022 A | 11/1998 | Scott | |
| 6,553,087 B1 * | 4/2003 | Alelyunas | H03H 17/0642 375/357 |
| 10,797,920 B1 * | 10/2020 | Chavez | H04L 27/122 |
| 11,496,179 B1 * | 11/2022 | Chavez | H04B 1/04 |
| 2003/0147655 A1 * | 8/2003 | Shattil | H04L 27/00 398/76 |
| 2009/0004981 A1 * | 1/2009 | Eliezer | H03F 1/3247 455/127.1 |
| 2011/0051783 A1 * | 3/2011 | Cahn | H04B 1/707 375/302 |
| 2011/0116535 A1 * | 5/2011 | Mori | H04L 27/361 375/224 |

FOREIGN PATENT DOCUMENTS

CN 106054140 A 10/2016

\* cited by examiner

*Primary Examiner* — Emmanuel Bayard

(57) ABSTRACT

A method, system, and apparatus for applying dithering to waveforms in a transmitter such as a Bluetooth transmitter. A current waveform corresponding to a current bit of a bitstream is received where the current waveform has a nominal frequency deviation defined by a value of the current bit. Based on the determination that the current waveform and an immediately previous bit of the bitstream are associated with different bit values, a first dithered signal is output which is defined by a first frequency offset pseudorandomly selected from a first set of frequency offsets. A subsequent waveform to the current waveform is received corresponding to a subsequent bit of the bitstream. Based on the subsequent bit and the current bit being associated with bits of the same value, a second dithered signal is output which is defined by a second frequency offset pseudorandomly selected from a second set of frequency offsets.

20 Claims, 4 Drawing Sheets

TRANSMIT SPECTRUM MANAGEMENT FOR BLUETOOTH COMMUNICATION AND APPARATUS FOR MANAGEMENT

FIELD of USE

This disclosure generally relates to Bluetooth communication, and more particularly to transmit spectrum management by frequency dithering to reduce an amplitude of spectral lines in a power spectral density (PSD) of a transmit signal of the Bluetooth communication.

BACKGROUND

The Institute of Electrical and Electronics Engineers (IEEE) standardized Bluetooth as IEEE 802.15.1. Bluetooth is a wireless technology standard that is used for exchanging data between devices over a short distance. Bluetooth Low Energy Long Range (BLR) is an improvement over Bluetooth and is intended to provide considerably reduced power consumption and a longer communication range. A transmitter which performs BLR processing includes a forward error correction (FEC) encoder, a mapper, frequency shift keying (FSK) coder, and a continuous phase modulator. The FEC encoder adds redundant bits to a bitstream to be transmitted by the transmitter to help a receiver which receives the bitstream detect and correct transmission errors. The FEC for BLR is typically ½ rate FEC which means that one redundant bit is added for each data bit in the bitstream. The mapper maps each bit of the coded bitstream to either a 0011 bit sequence or 1100 bit sequence to form a mapped bitstream. The FSK coder includes a pulse shaping filter (PSF) which generates a frequency modulated waveform based on a value of a bit in the mapped bitstream which the continuous phase modulator then modulates on a carrier frequency to form a transmit signal which the transmitter transmits. Runs of 0's and 1's in the mapped bitstream produces spectral lines in a power spectral density (PSD) of the transmit signals associated with the mapped bits with an amplitude which exceed a PSD limit such as 8 dBm/3 KHz defined by the Federal Communications Commission (FCC). To reduce the amplitude of these spectral lines, the transmitter has to transmit at a lower power so that the transmit signal remains within communication transmission requirements.

Figure 1:
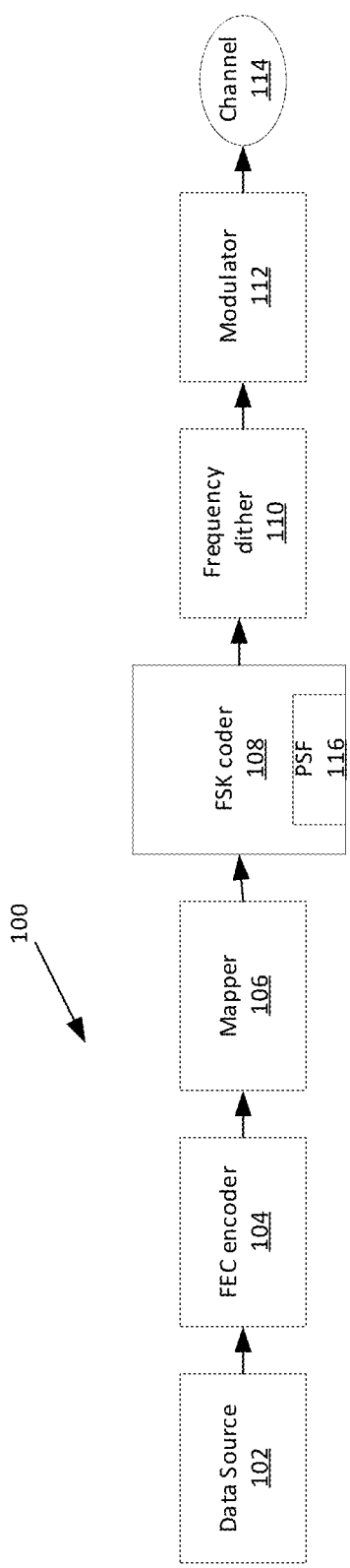
FIG. 1 is a block diagram of an example Bluetooth transmitter in accordance with an embodiment.

The drawings are for the purpose of illustrating example embodiments, but it is understood that the embodiments are not limited to the arrangements and instrumentality shown in the drawings.

DETAILED DESCRIPTION

A Bluetooth transmitter operating in accordance with Bluetooth Low Energy Long Range (BLR) maps zero bits and one bits of a bitstream to a respective sequence of bits to form a mapped bitstream. A frequency shift keying (FSK) process is used then to represent a zero bit and a one bit of the mapped bitstream as a respective nominal frequency deviation from a center frequency of a waveform. For example, a zero bit is represented as a nominal frequency deviation of −225 kHz from a center frequency of a waveform and a one bit is represented as a nominal frequency deviation of +225 kHz (or vice versa) from a center frequency of a waveform. In an example, the FSK coder includes a Gaussian pulse shaping filter (PSF) to smooth the frequency deviations of the waveform and use the spectrum efficiently. The waveform is then modulated at a carrier frequency to form a transmitted signal.

At a 20 dBm transmit power, an amplitude of the spectral lines in a power spectral density (PSD) of the transmitted signals associated with the mapped bits typically exceeds Federal Communications Commission (FCC) requirements. To reduce the amplitude of these spectral lines, the transmitter has to reduce a transmit power of the transmit signal which increases transmission errors or decreases transmission range.

Embodiments disclosed herein are directed to reducing amplitude of spectral lines in the PSD of signals transmitted by a Bluetooth transmitter to meet Bluetooth transmission requirements without having to reduce transmit power. The amplitude of the spectral lines is reduced by applying frequency dithering to the waveform that represents a bit of the mapped bitstream at an output of the pulse shaping filter. In an example, the nominal frequency deviation in a waveform associated with a current bit of the mapped bitstream is changed by a pseudorandom frequency offset referred to as delta_1 when a value of a previous bit of the mapped bitstream differs from a value of the current bit. In another example, the current bit is a first bit of a sequence of bits in the mapped bitstream having a same value. A nominal frequency deviation in a waveform associated with each bit in the sequence following the first bit is further changed by the delta_1 corresponding to the first bit and another pseudorandom frequency offset referred to as delta_2. The waveform after the frequency dithering is then modulated at a carrier frequency to form a transmitted signal. Delta_1 and delta_2 are selected so that the transmitted signal does not exceed a maximum frequency deviation defined by the Bluetooth transmission requirements. The dithering added to the nominal frequency deviations of waveforms associated with each bit of the mapped bitstream results in reduced amplitude of the spectral lines in the PSD of the corresponding transmitted signals and ability to transmit at higher powers while meeting the Bluetooth transmission requirements. Well known instructions, protocols, structures, and techniques have not been shown in detail in order not to obfuscate the description.

Example Systems

FIG. 1 is a block diagram of an example Bluetooth transmitter 100 in accordance with an embodiment. Bluetooth is a wireless technology standard that is used for exchanging data between devices over a short distance. The Institute of Electrical and Electronics Engineers (IEEE) standardized Bluetooth as IEEE 802.15.1. Bluetooth Low Energy Long Range (BLR) is an improvement over Bluetooth and is intended to provide considerably reduced power consumption and a longer communication range.

The example transmitter 100 may include in a data source 102, a forward error correction (FEC) encoder 104, a mapper 106, a frequency shift keying (FSK) coder 108, a frequency dither 110, and a modulator 112. In an example, the FSK coder 108 may have a pulse shaping filter (PSF) 116. The data source 102, mapper 106, FEC coder 108, frequency dither 110, and modulator 112 may be each implemented using circuitry such as analog circuitry, mix signal circuitry, memory circuitry, logic circuitry, processing circuitry arranged to execute code stored in a memory and when executed by the processing circuitry perform the disclosed functions, or combinations thereof. In other example, the transmitter 100 may include different components than what is shown or not be limited to the illustrated components.

The data source 102 may generate a bitstream to be transmitted over a channel 114 such as an air interface and received by a receiver (not shown). The bitstream may be 125 kbps in an example. The channel 114 may introduce errors in the bitstream which is transmitted. To reduce the errors in the bitstream, the FEC encoder 104 adds redundant bits to help the receiver detect and correct transmission errors. In an example, the FEC encoder 104 may add one redundant bit for every bit in the bitstream resulting in a ½FEC rate encoding. The mapper 106 of the transmitter 100 may then map each bit to a sequence of bits depending on a value of the bit. In BLR, a zero bit may be mapped to a sequence of bits 0011 and a one bit may be mapped to a sequence of bits 1100 in an example. In another example, a one bit may be mapped to a sequence of bits 0011 and a zero bit may be mapped to a sequence of bits 1100 in an example. The bits may be mapped to other sequences as well.

The mapped bitstream output by the mapper 106 may be provided to the FSK coder 108. An FSK process is used to represent a zero bit and a one bit of the mapped bitstream as different nominal frequency deviations from a reference frequency in a waveform. For example, a zero bit may be represented as a first nominal frequency deviation from the reference frequency in the waveform and a one bit may be represented as a second nominal frequency deviation from the reference frequency in the waveform. In an example, the first nominal frequency may be −225 kHz and the second nominal frequency may be +225 kHz or vice versa. In an example, the PSF 116 such a Gaussian pulse shaping filter (PSF) may further process the waveform to smooth the frequency deviation of the waveform and use the spectrum efficiently.

Conventionally, the waveform output by the FSK coder 108 may be provided to the modulator 112. The modulator 112 may be a continuous phase modulator to modulate the waveform at a carrier frequency for transmission to the receiver as a transmitted signal. In BLR, the carrier frequency may be 2.4 GHz or 2.48 GHz in an example. Because the FSK coder 108 represents bits of the mapped bitstream as predetermined nominal frequency deviations, a power spectral density of the transmitted signals corresponding to the bits of the mapped bitstream may comprise spectral lines with an amplitude which exceed a maximum power spectral density defined by communication requirements such as 8 dB/3 kHz specified by the Federal Communications Commission (FCC).

Embodiments disclosed herein are directed to reducing the amplitude of the spectral lines in the power spectral density of the transmitted signals by frequency dithering. In an example, the waveform output by the FSK coder 108 is provided to the frequency dither 110. Dithering is applied to the waveform based on the value of bit in the mapped bitstream associated with the waveform to form a dithered waveform. The dithered waveform may then be modulated at a carrier frequency and transmitted as a transmit signal.

In one example, the dithering is applied based on detecting a transition of bit values in in the mapped bitstream. A bit in the mapped bitstream may transition from a zero bit to a one bit or vice versa. If a nominal frequency deviation in the waveform output by the FSK coder 108 corresponding to a current bit is a zero bit, dithering is applied to a nominal frequency deviation corresponding to the zero bit when a value of a previous bit of the mapped bitstream corresponds to a one bit. Similarly, if a nominal frequency deviation in the waveform output by the FSK coder 108 corresponding to a current bit is a one bit, dithering is applied to a nominal frequency deviation corresponding to the one bit when a value of a previous bit of the mapped bitstream corresponds to a zero bit. The dithering which is applied is a frequency offset randomly selected from a first set of frequency offsets and added to the nominal frequency deviation corresponding to the current bit.

In another example, the dithering is applied based on detecting a sequence of bits with a same value. The first bit of the sequence and a prior bit may have a different bit values resulting in the nominal frequency deviation associated with a first bit of the sequence being dithered with the frequency offset randomly selected from the first set of frequency offsets. The nominal frequency deviations of the waveforms output by the FSK coder 108 associated with remaining bits of the sequence of bits in the mapped bitstream with same values may also be dithered. For a sequence of zero bits, dithering is applied to a nominal frequency deviation in the waveform output by the FSK coder 108 corresponding to a zero bit in the sequence of bits when a value of a previous bit of the mapped bitstream corresponds to a zero bit. For a sequence of one bits, dithering is applied to a nominal frequency deviation in the waveform output by the FSK coder 108 corresponding to a one bit in the sequence of bits when a value of a previous bit of the mapped bitstream corresponds to a one bit. The dithering which is applied may be a frequency offset randomly selected from a second set of frequency offsets different from the first set and the frequency offset selected from the first set for the first bit of the sequence of bits. The process of randomly selecting a frequency offset from the second set of frequency may be repeated for each bit in the sequence of bits with the same value to form a corresponding dithered waveform.

The dithering which is applied by the frequency dither 110 pseudorandomizes the frequency deviation corresponding to the zero bit or one bit of the mapped bitstream to form a dithered waveform provided to the modulator 112. The modulator 112 may modulate the dithered waveform at the carrier frequency for transmission over the channel 114 to the receiver. The transmitted signal resulting from the dithering may be transmitted at a higher power than if dithering was not applied without the spectral lines of the transmitted signal exceeding a maximum amplitude defined by communication requirements such as 8 dBm 3 kHz. For example, the transmitted signal may be transmitted at 20 dBm with maximum spectral density of 8 dBm/3 kHz with as a result of the dithering instead of 14 dBm with a maximum spectral density of 8 dBm/3 kHz without dithering. The higher power of the transmit signal reduces errors in the bitstream recovered by the receiver based on the transmitted signal and/or increases communication range.

Figure 2:
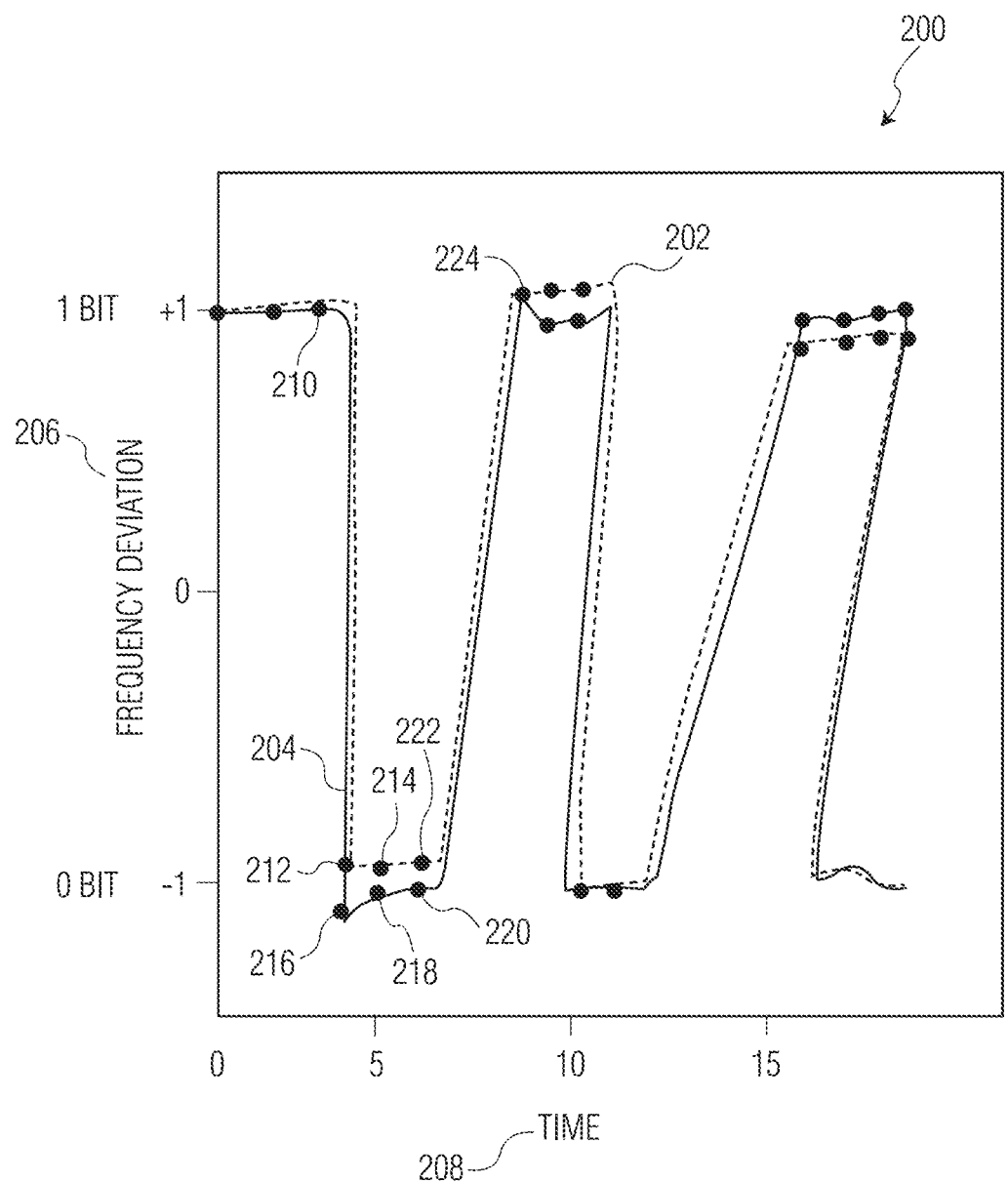
FIG. 2 illustrates an example dithering process performed by a frequency dither of the Bluetooth transmitter in accordance with an embodiment.

FIG. 2 illustrates an example dithering process performed by the frequency dither 110 in accordance with an embodiment. Plot 200 illustrates an example output 202 by the FSK coder 108 without dithering as a dotted line and an example dithered output 204 by the frequency dither 110 with dithering as a solid line. The outputs are shown as a function of frequency deviation versus time. The plot 200 has a vertical axis 206 which indicates the frequency deviation from a center frequency of zero and a horizontal axis 208 which indicates time. A nominal frequency deviation may have a magnitude such as 225 kHz and direction such as +225 kHz or −225 KHz. The +1 frequency deviation may represent the nominal frequency deviation with a positive magnitude such as +225 kHz and the −1 frequency deviation may represent the nominal frequency deviation with a negative magnitude such as −225 kHz.

The FSK coder 108 may represent values of bit of the mapped bitstream as a waveform with the +1 or −1 frequency deviation. A waveform with a +1 nominal frequency deviation may be assigned to a one bit in the mapped bitstream and a waveform with the −1 nominal frequency deviation may be assigned to a zero bit in the mapped bitstream, or vice versa. Example sample points 210, 212, 214, 222, 224 of the output 202 and example sample points 216, 218, 220 of the dithered output 204 may each represent a waveform with a specified frequency deviation. In an example, sample point 210 may represent a waveform output by the FSK coder 108 with a nominal frequency deviation of +1 which corresponds to a one bit and sample point 212 may represent a waveform output by the FSK coder 108 with a nominal frequency deviation of −1 which corresponds to a zero bit. The frequency dither 110 may apply dithering to the waveforms 202 to generate corresponding dithered waveforms 204 output by the frequency dither 110. For example, sample point 216 may represent a dithered waveform resulting from dithering the waveform of sample point 212. As another example, sample point 218 may represent a dithered waveform resulting from dithering the waveform of sample point 214. As yet another example, sample point 220 may represent a dithered waveform resulting from dithering the waveform of sample point 222.

In one example, the dithering performed by the frequency dither 110 may comprise detecting in the output 202 a first waveform with a first nominal frequency deviation corresponding a first bit in the mapped bitstream having a first value and an immediately previous waveform with a second nominal frequency deviation corresponding to an immediately previous second bit in the mapped bitstream having a second value. In this example, the first bit value and the second bit value are different. The different bit values are indicative of a transition from a zero to one bit one (or vice versa) in the mapped bitstream. To illustrate in plot 200, the respective waveforms associated with sample point 210 and 212 at time 3 and 4 may transition from +1 to −1 in the output 202 indicating a transition in bit values of the mapped bitstream from a one bit to a zero bit in this example. The nominal frequency deviation of the waveform 212 after the transition is modified by a frequency offset delta_1 to form dithered waveform associated with sample point 216 with a frequency:

Dithered Waveform Frequency=nominal frequency deviation +delta_1 Delta_1 may be pseudorandomly selected from a set of candidate delta_1 frequency offsets such as:

Set of candidate delta_1 frequency offsets: (delta_$1^1$, delta_$1^2$, delta_$1_3$, or delta_$1^4$) where delta_$1''$ is a candidate frequency offset. A number of members of the set may be more or less than four in other examples. The pseudorandom selection may be based on a pseudorandom number generator generating a pseudorandom number used to select the delta_1 frequency offset from the set of candidate delta_1 frequency offsets. The set may include −0.1, −0.05, 0.05, and 0.1 in an example where each member of the set may indicate a fraction of the nominal frequency deviation which is to be added to the nominal frequency deviation. For example, if the delta_1 is selected as −0.1 and the nominal frequency deviation is 225 kHz, the delta_1 added to the nominal frequency deviation is −22.5 kHz to equal to a dithered waveform frequency of 202.5 kHz for sample point 216. In other examples, the set of candidate frequency offsets may indicate an actual offset value to produce the dithering such as (30 kHz, 15 kHz, 7.5 kHz, 3.75 kHz). For example, 30 kHz may be psueorandomly selected to be added to the nominal frequency deviation to perform the dithering.

In another example, the dithering performed by the frequency dither 110 may comprise detecting a first waveform in the output 202 with a nominal frequency deviation corresponding to a first bit value and an immediately previous second waveform with a nominal deviation corresponding to a second bit value. In this example, the first bit value and the second bit value are the same. The same bit values are indicative of no transition from a zero to one bit one (or vice versa) in the mapped bitstream. To illustrate in plot 200, the respective waveforms associated with sample point 212 and 214 at time 4 and 5 may not transition from −1 in the output 202 indicating no transition in bit values of the mapped bitstream. A frequency offset is added to the nominal frequency deviation of the waveform associated with sample point 214 to form the dithered waveform associated with sample point 218. The frequency offset may be a function of the delta_1 applied to the waveform associated with sample point 214 which is the first bit of the two or more bits of same value and a frequency offset delta_2 to form dithered waveform associated with sample point 218 with a frequency:

Dithered Waveform Frequency=nominal frequency deviation+delta_1+delta_2 The delta_2 may be pseudorandomly chosen from a set of candidate delta_2 frequency offsets such as:

Set of candidate delta_2 frequency offsets: (delta_$2^1$, delta_$2^2$, delta_$2^3$, delta_$2^4$) where delta_$2''$ is a frequency offset. A number of members of the set may be more or less than four in other examples. The pseudorandom selection may be based on a pseudorandom number generator generating a pseudorandom number to select the delta_2 from the set of candidate delta_2 frequency offsets. The set may include −0.01, −0.005, 0.005, and 0.01 in an example and indicate a fraction of the nominal frequency deviation which is to be added to the nominal frequency deviation or an actual frequency offset value. Each frequency offset in the set of candidate delta_2 frequency offsets may be less than the each frequency offset in the set of candidate delta_1 frequency offsets. The delta_1 and another delta_2 pseudorandomly selected may be applied to each subsequent waveform in the output 202 corresponding to a bit value when an immediately previous waveform in the output 202 corresponds to a same bit value until a transition in bit value occurs. For example, the delta_1 and delta_2 pseudo-randomly selected may be applied to the waveform associated with sample point 222 with nominal frequency deviation −1 at time 6 to form the waveform associated with sample point 220 until there is a transition of a waveform to nominal frequency deviation +1 indicated by the waveform associated with sample point 224 in the output 202. Further, the different frequency deviations of the waveforms associated with sample point 220 and 218 indicate that different delta_2 were pseudorandomly selected from the set of candidate delta_2 frequency offsets for each sample point.

In an example, the output 202 and dithered output 204 shown as continuous time domain signals may result from filtering respective sample points. The filter may be the Gaussian PSF 116 in an example. Further, the value of delta_1 and delta_2 may be selected so that an average frequency deviation of the dithered output 204 modulated by the modulator 112 for transmission at a carrier frequency is within an maximum average frequency deviation defined by Bluetooth transmission requirements. The maximum average frequency deviation may be between 225 kHz and 275 kHz in an example.

Figure 3:
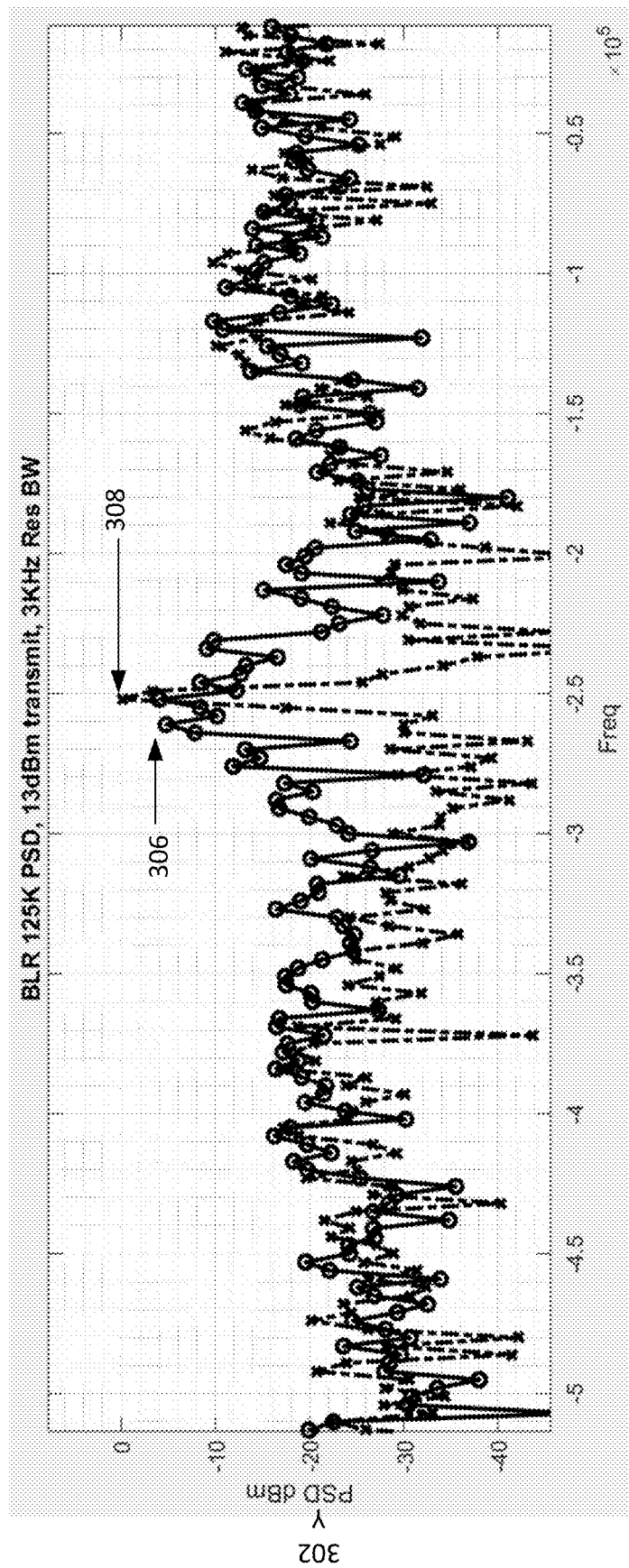
FIG. 3 illustrates an example power spectral density of transmitted signals as a result of applying the dithering process in accordance with an embodiment.

FIG. 3 illustrates an example power spectral density 300 of transmitted signals as a result of applying the dithering process in accordance with an embodiment. A vertical Y axis 302 of the power spectral density 300 shows a power (dBm) of the transmitted signals per 3 kHz and a horizontal X axis 304 shows a frequency of the transmitted signals at a transmit power of 13 dB. Plot 308 of the power spectral density 300 shown as a dotted line illustrates the power spectral density when the frequency dithering is not applied to the waveforms output by the FSK coder 108 which results in spectral line at 2.52 GHz with a power/3 kHz of −0.09 dB/3 kHz as a highest power. Plot 306 of the power spectral density shown as a solid line illustrates the power spectral density when the frequency dithering is applied to the waveforms output by the FSK coder 108 which results in a spectral line at 2.61 GHz having a power/3 kHz of −4.8 dB/3 kHz as a highest power. The dithering results in about a 4.7 dBm improvement in PSD which allows the transmitter 100 to transmit at a higher power while staying within a power spectral density limit. If the power spectral density limit is 8 dBm/3 kHz, then a transmitter may transmit up to 14 dBm of power without dithering while not exceeding the power spectral density limit and up to 20 dBm of power with dithering while not exceeding the power spectral density limit in an example.

Example Methods

Figure 4:
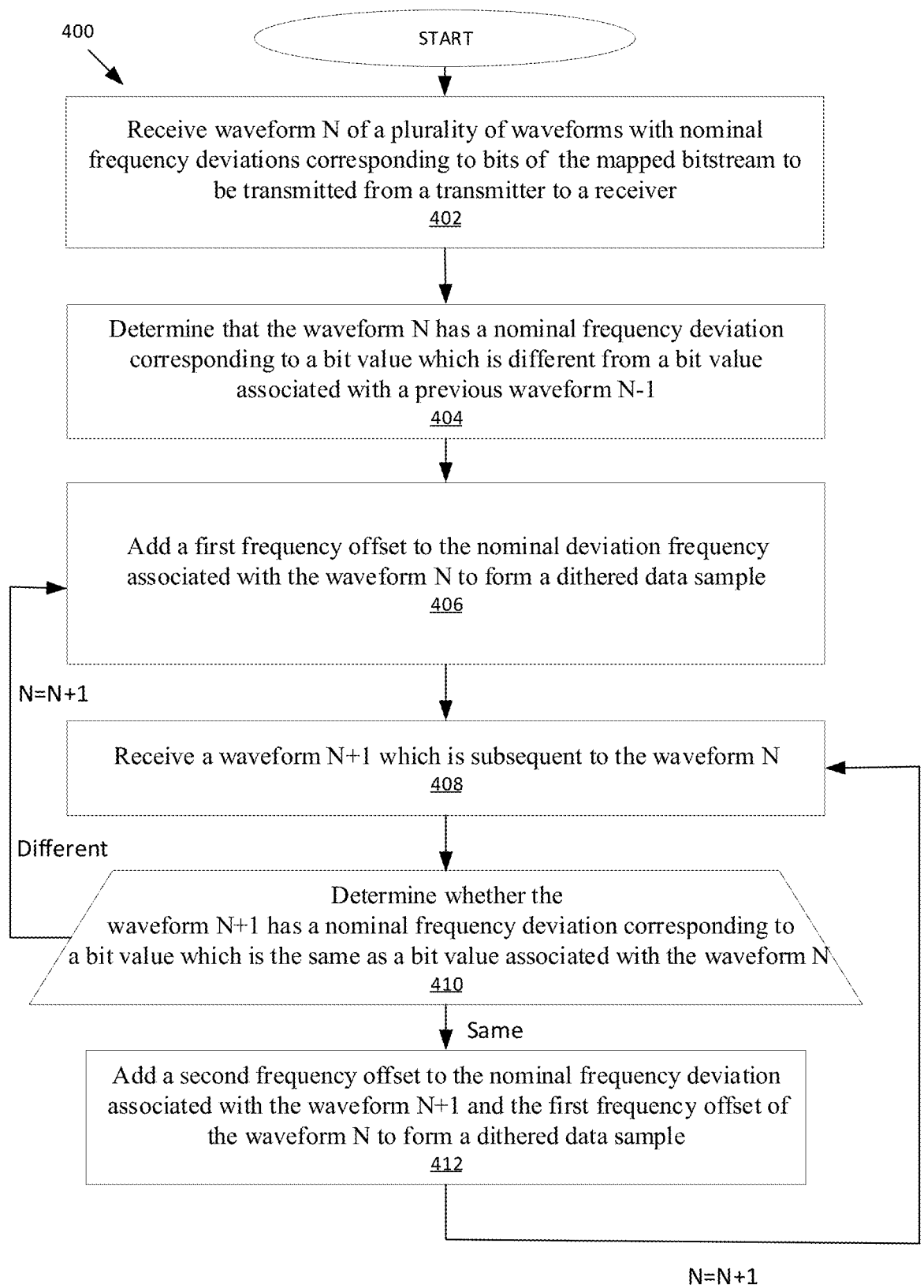
FIG. 4 is an flow chart of example processing associated with dithering in accordance with an embodiment.

FIG. 4 is a flow chart 400 of example processing performed by the frequency dither 110 in accordance with an embodiment of the invention. At 402, a waveform N of a plurality of waveforms with nominal frequency deviations corresponding to bits of the mapped bitstream to be transmitted from the transmitter 100 to a receiver is received by the frequency dither 110. Each waveform may be indexed by a unique integer N such that later received waveforms corresponding to a later received bit of the mapped bitstream may have a higher index value than earlier received waveforms corresponding to an earlier received bit of the mapped bitstream in an example. N may be initially set to one in this example. A bit of the mapped bitstream may be coded as a first nominal frequency deviation if a bit is a zero and coded as a second nominal frequency deviation if a bit is a one. At 404, a determination is made that the waveform N has a nominal frequency deviation corresponding to a bit value which is different from a bit value associated with a previous waveform. At 406, a first frequency offset is added to the nominal deviation frequency associated with the waveform N to form a dithered waveform. The first frequency offset may be pseudorandomly chosen from a set of frequency offsets and correspond to delta_1. At 408, a waveform which is subsequent to the waveform N is received by the frequency dither 110. For example, the waveform subsequent may be N+1. At 410, a determination is made whether the waveform N+1 has a nominal frequency deviation corresponding to a bit value which is the same as bit value associated with the waveform N. If the waveform N+1 has a nominal frequency deviation corresponding to a bit value which is the same as a bit value associated with the waveform N, then at 412, a second frequency offset is added to the nominal frequency deviation corresponding to the waveform N+1 and the first frequency offset of the waveform N to form a dithered waveform. The second frequency offset may be pseudorandomly chosen from a set of frequency offsets and correspond to delta_2. Processing may then return to 408 to receive another waveform where now N=N+1. If the waveform N+1 has a nominal frequency deviation corresponding to a bit value which is different from the bit value associated with the waveform N, then processing returns to 406 where now N=N+1. In examples, the average deviation of the waveform may be within a predefined range based on the pseudorandom selection of the frequency offsets which for Bluetooth is 225 kHz to 275 kHz. The dithered waveform may define the output of the frequency dither 110. The output of the frequency dither 110 may be input to the modulator 112 which modulates the time domain output of the waveform at the carrier frequency to form the transmitted signal transmitted over the channel 114.

The frequency dither 110 as described herein may be implemented in transmitters other than the Bluetooth transmitter 100. Further, a bitstream other than a mapped bitstream may be input to the FSK coder 108 to generate the waveform which is then input to the frequency dither 110. For instance, the bitstream from the FEC encoder 104 may be input to the FSK coder 108. Other variations are also possible consistent with the principles of the invention.

In one embodiment, a method for applying dithering to waveforms in a transmitter is disclosed. The method comprises receiving a current waveform corresponding to a current bit of a bitstream, the current waveform having a first frequency deviation defined by a value of the current bit; determining that the current bit and an immediately previous bit of the bitstream are associated with different bit values; based on the determination that the current bit and the previous bit of the bitstream are associated with different bit values, outputting a first dithered waveform which is defined by the first frequency deviation and a first frequency offset pseudorandomly selected from a first set of frequency offsets; receiving a subsequent waveform to the current waveform corresponding to a subsequent bit of the bitstream; determining that the subsequent bit and the current bit are associated with bits of a same value; and based on the subsequent bit and the current bit being associated with bits of the same value, outputting a second dithered waveform which is defined by the first frequency offset, a second frequency deviation associated with a value of the subsequent bit, and a second frequency offset pseudorandomly selected from a second set of frequency offsets. In an example, the method further comprises receiving another subsequent waveform corresponding to another subsequent bit of the bitstream which follows the current bit and the subsequent bit; determining that the current bit, the subsequent bit, and other subsequent bit are associated with same bit values; and based on the determination that the current bit, the subsequent bit, and the other subsequent bit are associated with same bit values, outputting a third dithered waveform which is defined by the first frequency offset, a third frequency deviation associated with a value of the other subsequent bit, and a third frequency offset pseudorandomly selected from the second set of frequency offsets. In an example, the second frequency offset and third frequency offset are different. In an example, the method further comprises filtering the current waveform and subsequent waveform by a Gaussian filter. In an example, the method further comprises modulating the dithered waveform at a carrier frequency for transmission over an air channel. In an example, the spectral lines of a power spectral density of the dithered waveform modulated at a carrier frequency is less than 8 dB/3 kHz. In an example, a frequency deviation of the dithered waveform ranges from 225 kHz to 275 kHz. In an example, the first set of frequency offset comprises a plurality of frequency offsets each less than a magnitude of the first frequency deviation. In an example, the bitstream comprises 0011 bit sequences or 1100 bit sequences of bits resulting from mapping bit values of the bitstream to the 0011 bit sequences or 1100 bit sequences. In an example, each of the frequency offsets of the first set of frequency offset is greater than each of the frequency offsets of the second set of frequency offsets.

In another embodiment, frequency dither circuitry for a wireless transmitter is disclosed. The frequency dither circuitry is configured to receive a current waveform corresponding to a current bit of a bitstream, the current waveform having a first frequency deviation defined by a value of the current bit; determine that the current bit and an immediately previous bit of the bitstream are associated with different bit values; based on the determination that the current bit and the previous bit are associated with different bit values, output a first dithered waveform which is defined by the first frequency deviation and a first frequency offset pseudorandomly selected from a first set of frequency offsets; receive a subsequent waveform to the current waveform corresponding to a subsequent bit of the bitstream; determine that the subsequent bit and current bit are associated with bits of a same value; and based on the subsequent bit and current bit being associated with bits of the same value, output a second dithered waveform which is defined by the first frequency offset, a second frequency deviation associated with a value of the subsequent bit, and a second frequency offset pseudorandomly selected from a second set of frequency offsets. In an example, the frequency dither circuitry is arranged to receive another subsequent waveform corresponding to another subsequent bit of the bitstream which follows the current bit and the subsequent bit; determine that the current bit, the subsequent bit, and the other subsequent bit are associated with same bit values; and based on the determination that the current bit, subsequent bit, and other subsequent bit are associated with same bit values, output a third dithered waveform which is defined by the first frequency offset, a third frequency deviation associated with a value of the other subsequent bit, and a third frequency offset pseudorandomly selected from the second set of frequency offsets. In an example, the second frequency offset and third frequency offset are different. In an example, the current waveform and subsequent waveform received by the frequency dither are filtered by a Gaussian filter. In an example, spectral lines of a power spectral density of the transmitted signal is less than 8 dB/3 kHz. In an example, a frequency deviation of the dithered waveform ranges from 225 kHz to 275 kHz. In an example, the first set of frequency offset comprises a plurality of frequency offsets each less than a magnitude of the first frequency deviation. In an example, the bitstream comprises 0011 bit sequences or 1100 bit sequences of bits resulting from a mapper mapping bit values of the bitstream to the 0011 bit sequences or 1100 bit sequences. In an example, the frequency deviations are from a reference frequency. In an example, each of the frequency offsets of the first set of frequency offset is greater than each of the frequency offsets of the second set of frequency offsets.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for applying dithering to waveforms in a transmitter, the method comprising:
   receiving a current waveform corresponding to a current bit of a bitstream, the current waveform having a first frequency deviation defined by a value of the current bit;
   determining that the current bit and an immediately previous bit of the bitstream are associated with different bit values;
   based on the determination that the current bit and the previous bit of the bitstream are associated with different bit values, outputting a first dithered waveform which is defined by the first frequency deviation and a first frequency offset pseudorandomly selected from a first set of frequency offsets;
   receiving a subsequent waveform to the current waveform corresponding to a subsequent bit of the bitstream;
   determining that the subsequent bit and the current bit are associated with bits of a same value; and
   based on the subsequent bit and the current bit being associated with bits of the same value, outputting a second dithered waveform which is defined by the first frequency offset, a second frequency deviation associated with a value of the subsequent bit, and a second frequency offset pseudorandomly selected from a second set of frequency offsets.

2. The method of claim 1, further comprising:
receiving another subsequent waveform corresponding to another subsequent bit of the bitstream which follows the current bit and the subsequent bit;
determining that the current bit, the subsequent bit, and other subsequent bit are associated with same bit values; and
based on the determination that the current bit, the subsequent bit, and the other subsequent bit are associated with same bit values, outputting a third dithered waveform which is defined by the first frequency offset, a third frequency deviation associated with a value of the other subsequent bit, and a third frequency offset pseudorandomly selected from the second set of frequency offsets.

3. The method of claim 2, wherein the second frequency offset and third frequency offset are different.

4. The method of claim 1, further comprising filtering the current waveform and subsequent waveform by a Gaussian filter.

5. The method of claim 1, further comprising modulating the dithered waveform at a carrier frequency for transmission over an air channel.

6. The method of claim 1, wherein spectral lines of a power spectral density of the dithered waveform modulated at a carrier frequency is less than 8 dB/3 kHz.

7. The method of claim 1, wherein a frequency deviation of the dithered waveform ranges from 225 kHz to 275 kHz.

8. The method of claim 1, wherein the first set of frequency offset comprises a plurality of frequency offsets each less than a magnitude of the first frequency deviation.

9. The method of claim 1, wherein the bitstream comprises 0011 bit sequences or 1100 bit sequences of bits resulting from mapping bit values of the bitstream to the 0011 bit sequences or 1100 bit sequences.

10. The method of claim 1, wherein each of the frequency offsets of the first set of frequency offset is greater than each of the frequency offsets of the second set of frequency offsets.

11. Frequency dither circuitry for a wireless transmitter, the frequency dither circuitry configured to:
receive a current waveform corresponding to a current bit of a bitstream, the current waveform having a first frequency deviation defined by a value of the current bit; determine that the current bit and an immediately previous bit of the bitstream are associated with different bit values; based on the determination that the current bit and the previous bit are associated with different bit values, output a first dithered waveform which is defined by the first frequency deviation and a first frequency offset pseudorandomly selected from a first set of frequency offsets; receive a subsequent waveform to the current waveform corresponding to a subsequent bit of the bitstream; determine that the subsequent bit and current bit are associated with bits of a same value; and based on the subsequent bit and current bit being associated with bits of the same value, output a second dithered waveform which is defined by the first frequency offset, a second frequency deviation associated with a value of the subsequent bit, and a second frequency offset pseudorandomly selected from a second set of frequency offsets.

12. The frequency dither circuitry of claim 11 further configured to receive another subsequent waveform corresponding to another subsequent bit of the bitstream which follows the current bit and the subsequent bit; determine that the current bit, the subsequent bit, and the other subsequent bit are associated with same bit values; and based on the determination that the current bit, subsequent bit, and other subsequent bit are associated with same bit values, output a third dithered waveform which is defined by the first frequency offset, a third frequency deviation associated with a value of the other subsequent bit, and a third frequency offset pseudorandomly selected from the second set of frequency offsets.

13. The frequency dither circuitry of claim 12, wherein the second frequency offset and third frequency offset are different.

14. The frequency dither circuitry of claim 11, wherein the current waveform and subsequent waveform received by the frequency dither are filtered by a Gaussian filter.

15. The frequency dither circuitry of claim 11, wherein spectral lines of a power spectral density of the transmitted signal is less than 8 dB/3 kHz.

16. The frequency dither circuitry of claim 11, wherein a frequency deviation of the dithered waveform ranges from 225 kHz to 275 kHz.

17. The frequency dither circuitry of claim 11, wherein the first set of frequency offset comprises a plurality of frequency offsets each less than a magnitude of the first frequency deviation.

18. The frequency dither circuitry of claim 11, wherein the bitstream comprises 0011 bit sequences or 1100 bit sequences of bits resulting from a mapper of the transmitter mapping bit values of the bitstream to the 0011 bit sequences or 1100 bit sequences.

19. The frequency dither circuitry of claim 11, wherein the frequency deviations are from a reference frequency.

20. The frequency dither circuitry of claim 11, wherein each of the frequency offsets of the first set of frequency offset is greater than each of the frequency offsets of the second set of frequency offsets.

* * * * *